Patented Feb. 5, 1929.

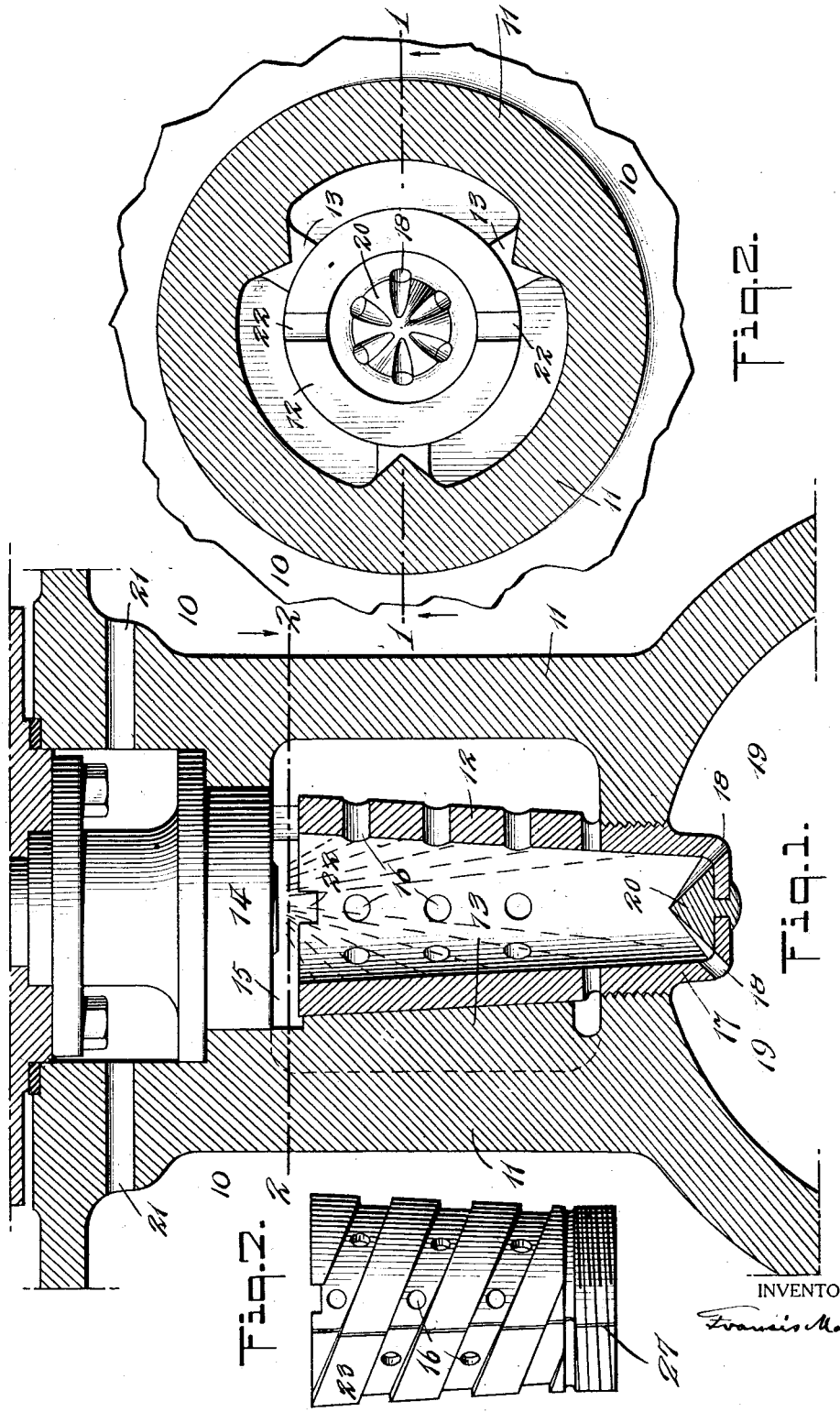

1,700,903

UNITED STATES PATENT OFFICE.

FRANCIS MARBURG, OF YONKERS, NEW YORK.

GASIFIER DEVICE AND METHOD OF INSTALLATION IN INTERNAL-COMBUSTION ENGINES.

Application filed November 16, 1923, Serial No. 675,182. Renewed August 26, 1927.

My invention relates to high compression internal combustion engines and particularly to types of engines, which contain a primary explosion- or combustion-chamber, the walls inclosing the latter being liquid-cooled and a gasifier tube or vessel, or partition member, within said chamber, in order to divide the latter substantially into two or more compartments. One object of my invention is to improve the design of the tube or vessel and the efficiency of the engine, and another object is to install the tube or vessel in such manner that it is uniformly semi-cooled within the chamber, whereby it may become uniformly hot without burning out. As an example of the type of engine referred to, the engine shown and described in the United States Patent No. 1,136,818, issued to H. F. Leissner, of April 20th, 1915, may be mentioned. Engines using gasifiers described therein, both for two cycle and four cycle types, are very efficient, but it has been found, especially in high speed engines and in engines of large sizes, that tubes burn out rapidly, necessitating frequent renewals of tubes, causing inconvenience, necessary stops and continuous expenses. If a tube is not renewed, after portions thereof have burned out or are destroyed, the engine smokes, develops much less power and is very inefficient. As a result, the engine speed and the field for such engines are limited.

Applicants' invention offers efficient means for semi-cooling such tubes or vessels, particularly portions thereof which heretofore were cooled very inefficiently, as will hereinafter be fully explained. Again, some portions of the tube which were heretofore cooled too much may now be kept at higher temperature. As a result of applicants' improvements, the number of revolutions and the piston speed of such engines, as well as their efficiency, are greatly increased, thus increasing horse power of a given size of engine, reducing correspondingly manufacturing cost and weight of engine per horse power. Other features of applicant's invention relate to improved designs of tubes and nozzles whereby gasifying and power of penetration of the gases, or vapors, while entering the main combustion chamber of an engine, are increased, as will be fully explained.

Figure 3:
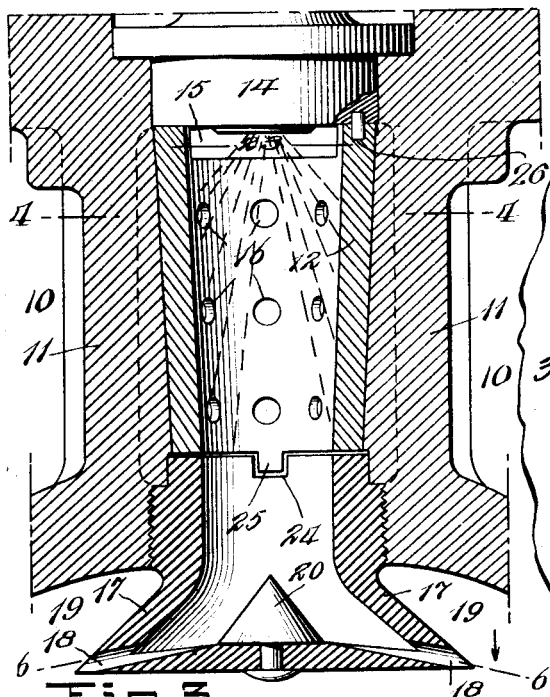
Figure 4:
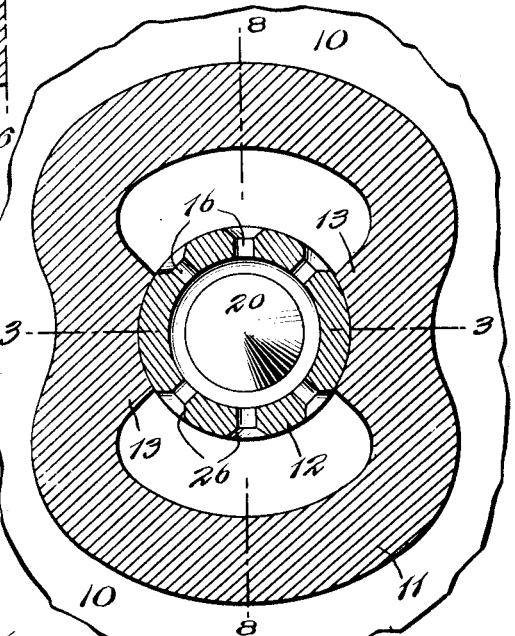
Figure 5:
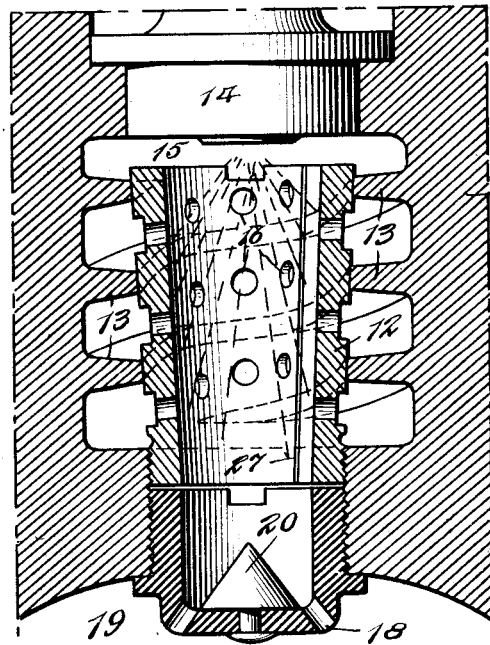
Figure 6:
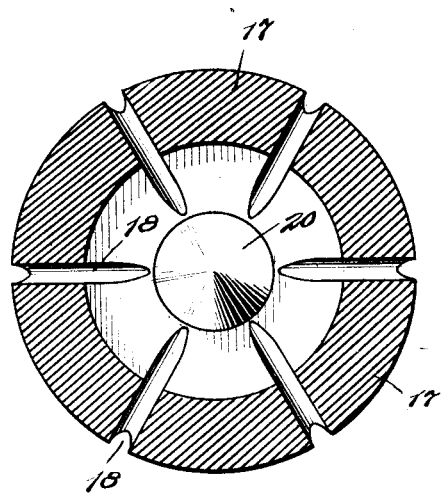

Referring now to the attached drawings, Figs. 1 and 2 show respectively a section through the axis of a tube and primary explosion- or combustion-chamber on line 1—1 of Fig. 2 and a cross-section through the same device in a plane perpendicular to the axis of the tube on line 2—2 of Fig. 1. Figs. 3 and 4 show respectively an axial section through another design on line 3—3 of Fig. 4 and a cross-section on line 4—4 of Fig. 3. Fig. 5 shows an axial section of still another design. Fig. 6 shows a section through a nozzle on line 6—6 of Fig. 3. Fig. 7 shows a view of a tube which may be used in connection with the design shown in Fig. 5.

Referring now more particularly to Figs. 1 and 2, 11 represents a wall of a casting or casing, the wall inclosing a primary chamber of an internal combustion engine. 10 represents a space surrounding the wall 11 and containing cooling liquid which may be circulated in known manner in order to cool the wall 11. 12 is a gasifier tube, located within the chamber, subdividing the latter preferably into a smaller radially inner and larger radially outer compartment. 13 represents cooling webs, which latter may more or less subdivide the outer compartment into separate compartments. The webs may be cast with the wall, as shown, or they may be portions of the tube, the object being, to conduct heat from the tube to the water-cooled wall, in order to prevent the tube from burning out and for other reasons explained hereinafter. The webs may at their inner peripheral surfaces be bored out straight, or taper, as shown, and the tube accurately fitted within or between said webs, thus forming cooling-contact-surfaces between the tube and webs. Referring to other details shown in Figs. 1 and 2, 14 is a fuel spray valve. 15 represents an annular space or opening, provided between the axially outer end of the tube or vessel and the spray valve or axially outer wall of the primary chamber, the opening establishing the principal or main permanent direct communication between the radially inner and outer compartments of the primary chamber, as shown herein. 16 represents holes within the wall of the tube, whereby additional direct communication may be established between the inner and outer compartments, for reasons which will be fully explained hereinafter. 17 is an extension of the tube which we may call a nozzle. 18 represents holes within the nozzle. 19 represents a portion of a cylinder- or main compression- or combustion-chamber of an internal combustion engine, the holes 18, as illustrated, forming communications between the main combustion-chamber and the radially inner compartment of the primary chamber. 20 is an air- or gas-conductor, or deflector, the object of the latter being to direct air during the compression stroke of the engine into the inner compartment of the primary chamber and again guiding the gases or vapors on their return into the main combustion chamber, during the power stroke of the engine. In order to understand the value of this conductor, it must be realized that air may be compressed in the main combustion chamber say to 400 or 500 lbs. per sq. i., more or less. The gases or the mixture of gases and vapors may flow out of the primary chamber and into the main combustion-chamber at a higher pressure. Whirling of the exceedingly dense and heavy air or gases at very high velocity, must be avoided as much as possible within the nozzle, because this delays or retards the air and greatly reduces the velocity of the vapors entering into the main combustion-chamber. This deflector greatly differs from the spray nozzle shown and explained in the above mentioned United States patent which has the object of breaking up or spraying fuel but which is inefficient and is not being used, because it offers great resistance to the flow of the dense air or mixture of gases and vapors. Applicant's device on the contrary reduces the resistance to the flow, increasing the velocity and power of penetration of the gases or mixture. This will be more fully referred to and explained later on. 21 are openings, permitting cooling water to circulate around the spray valve, cooling the latter in order to prevent partial gasifying of the fuel within the spray valve, which might otherwise cause irregular action of the spray valve. 22 may represent short slots by means of which a wrench may be applied for screwing in or unscrewing the tube.

Fuel pump and spray valve have no direct relation to applicant's invention and need not be explained, any known efficient fuel pump and spray valve being adapted in connection with my gasifier. It is important that inlet is afforded, of at least the major portion of the fuel, between the radially outer compartment of the primary chamber and the main combustion chamber. The place and direction in which fuel may be injected or sprayed into the primary chamber is indicated by fine broken lines in Figs. 1, 3 and 5.

The radially outer compartment, as shown, is preferably substantially isolated from the main combustion chamber, except communicating with the latter mainly by passage through the radially inner compartment.

It is furthermore preferable, as illustrated, to provide relatively large communication between inner and outer compartments and relatively small communication between the inner compartment and the main combustion chamber. The total capacity of the outer compartment or compartments preferably is greater than the capacity of the inner compartment, as shown. All of the above features are important in order to produce quick and efficient scavenging of fuel from the primary into the main combustion chamber, as will be explained more fully hereinafter.

Referring now to Figs. 3 and 4, the same numbers refer to the same parts as in Figs. 1 and 2. It will be noted, that the cooling webs have almost disappeared, the cooling wall being bent inwardly whereby the cooling water comes close to the tube at opposite sides, the cooling contact shown being much wider than shown before and the distance of heat transmission to the cooling water being much smaller. The heat therefore is absorbed much more rapidly by the cooling wall and in turn is absorbed quicker by the cooling water surrounding the wall. This latter design may be used where extreme cooling is required, on account of very high motor speed and high compression. The tube, which may be tapered, as shown, or straight if desired, and the nozzle 17, may be separate parts. 23 are two lugs at the outer end of the tube, being portions thereof, which lugs may rest against the spray valve, as shown, the valve holding the tube down in position. An advantage of using a separate tube, consists in permitting the tube to find its own correct center, whereby its semi-cooling or semi-heating becomes more uniform throughout its entire length, the cooling taking place substantially exclusively through means of the cooling webs, if clearance is left between the bottom of the tube and the nozzle, as shown herein.

It is important in all cases, as shown, that all cooling webs are arranged substantially symmetrically with regard to the longitudinal axis of the tube or dividing member, in order to allow substantially unhindered axial flow of the compressed air or gases throughout the radially outer compartment. The conical shape of the tube and bore is convenient because it may be ground into its seat, which may be advisable in extreme cases, in order to form perfect cooling-contact-surfaces between the tube and the wall. 24 are notches in the nozzle 17. 25 are lugs at the inner end of the tube. The tube may be assembled and may be locked in such manner that the holes in the tube are open and remain open permanently. This may be accomplished in the manner in which the tube is held down by the spray valve and by the lugs provided both at the outer and inner end of the tube. The outer lugs 23 may be secured by a nose or pin 26 which may be tight in the spray-valve, and which may penetrate into the lugs 23, the latter being cooled by the wall, as shown, while the inner lugs 25 may fit into the notches being provided in the nozzle 17.

It has been found, that water-cooled walls in primary chambers of these types of engines, are not affected at all by the heat nor by acid, within such limits, as occur in usual practice. and the webs therefore will stand up for the life of the motor. The finished surfaces of the bored out webs, no doubt, will remain in perfect condition provided they are perfectly covered by the tube, and the portion of the tube which are in direct close contact with the water-cooled wall, no doubt will remain in good condition, indefinitely, serving in turn as good heat-conductors for the perforated portions of the tube, which latter portions of course cannot be cooled directly by contact with the water-cooled wall, and which may therefore burn out after a long period of use, when the tube must be replaced. In assembling the parts the nozzle may be screwed in and adjusted, by means of a special wrench, which fits in the notches of the nozzle. The tube may be ground in its seat, by means of a special wrench being applied to the lugs. before the nozzle is being screwed into the casing.

Referring again to the nozzle, Fig. 3, it will be seen, that a similar deflector as explained hereinbefore has been inserted. The deflector consists of a raised portion in the center of the nozzle 17, a plurality of spray holes being arranged substantially in a circle around the raised portion. The deflector or conductor 20 deflects the dense inrushing air axially outwardly into the radially inner compartment of the primary chamber. During the power-stroke, the dense gases, or vapors, are rushing axially inwardly and are again deflected by the conductor, entering through spray holes 18, being forced at very high velocity. with great penetrating force, into the highly compressed air within the main combustion chamber, wherein it burns up as fast as it mixes with air.

Referring now to Fig. 5, the same numbers represent the same parts as in previous figures. This design differs from those previously explained, by having spiral cooling webs and spirally shaped outer compartments, the latter being arranged between the tube and the water-cooled wall. One or more spiral webs may be used, at any desired pitch or angle. The webs herein. as well as in previous designs, may or may not continue up to the axially inner or outer ends of the primary chamber. It will be seen from the drawing, that the tube, similarly as in Fig. 1, has a threaded portion at its inner end, while the casing has a threaded hole, wherein the threaded portion of the tube may be screwed, the tube, as shown, being tapered, a close cooling-contact-surface may be produced by screwing the tube tight into the casing. 27 represents a slot through the entire length of the wall of the tube, including the threaded portion, whereby the entire tube becomes elastic, the tube being under a uniform constant tension radially outwardly when being screwed in, but a slight opening may remain between the surfaces of the slotted wall, to permit of slight expansion if the tube becomes very hot. Spiral cooling-contact surfaces, as shown, may be provided between the tube and the webs. In any one of my constructions, it may or may not become advisable to slot the tube, as shown, in order to get permanent contact and prevent great radial stresses, which may occur, if the tube should not be able to expand freely, as explained, under the influence of excessive heat, which stresses would be transmitted to the water-cooled wall and might cause the latter to crack, unless some provision for expansion was made. The slot 27 shown in Figs. 5 and 7 cooperates with other features of my device, in producing a resilient tube and good cooling contact between the tube and webs or liquid-cooled wall, and the device is absolutely safe because the tube is resilient.

Fig. 6 shows a section through the nozzle shown in Fig. 3, taken on line 6—6. The spray holes preferably are cylindrical. They may be drilled by using a jig or by turning the cartridge after the holes have been drilled.

Fig. 7 shows a slotted tube, which may be used with the design shown in Fig. 5, the centers of the holes in the tube being arranged within a spiral curve of the same pitch as the cooling webs, being located centrally between the webs. The tube may or may not be slotted and it may or may not be turned down to a smaller diameter around the holes as shown herein.

In order to better explain the object of my invention, it is advisable to first explain the theory of the gasifier, which in its main features has been known, but has not been generally understood, nor have some of the explanations offered herein been published heretofore. In the illustrated device, oil in form of fine vapor, is sprayed into the radially inner compartment of a primary chamber, 10 degrees, more or less, ahead of top dead center position of the respective piston or crank, the timing of fuel injection varying considerably with the speed, size and type, of the engine. The compression in the cylinder- or main combustion-chamber and in the primary chamber, at that time may have reached already the point, where the temperature of the compressed air is sufficient to ignite the fuel, which therefore starts to burn as soon as it is injected. Since, however, only a small portion of the total amount of the air compressed within the cylinder, enters into the primary chamber, and since the small radially inner compartment receives the fuel charge, a very much oversaturated condition momentarily exists within the inner compartment, causing momentarily suppressed or slow combustion. Compressed air meanwhile continues rushing into the tube from the main compression- or combustion-chamber, through holes 18 within the nozzle 17, carrying a part of the mixture of hot gases and vapors through the large number of holes 16 within the tube, into the radially outer compartment of the primary chamber, further breaking up this fuel and mixing it with a larger quantity of pure, highly compressed air contained within the latter compartment and exploding, causing a quick rise of temperature and pressure within the primary chamber and forcing the fuel vapors and gases—the major portion of which at the moment of the explosion is still contained unburned within the tube and within the axially outer portion of the primary chamber—ahead of the explosion gases, axially inwardly through the tube into the main combustion-chamber, where the fuel burns up as quickly as it enters and mixes with the pure compressed air contained therein. The combination takes place substantially on the Diesel cycle, after which expansion takes place. During the continuation of the power stroke of the engine the remaining burned gases within the primary chamber expand into the main combustion chamber, whereupon compression is started and the same cycle is repeated as explained hereinbefore. These explanations refer specifically to two cycle engines. The gasifier action within 2 and 4 cycle engines is substantially the same.

The peculiar and valuable features of this gasifier, are, that strong explosion or very quick combustion occurs within the radially outer substantially isolated compartment of the primary chamber, on account of the perforations in the gasifier tube and on account of the peculiarly subdivided primary chamber, and that substantially the entire force of the explosion within the radially outer compartment is utilized in forcing the main body of unburned gases or vapors, which are (on account of the inrushing compressed air) at the beginning of the fuel injection mainly held within the tube and within the axially outer portion of the primary chamber, axially inwardly through the tube, into the main combustion chamber. This fuel scavenging action is strongest about at dead-center position of the respective piston or crank.

The explosion pressure within the primary chamber is considerably in excess of the compression pressure within the cylinder- or main combustion-chamber. The perforations of the tube and holes 18 of nozzles 17 may be so selected and the fuel injection into the primary chamber may be so timed, that practically all unburned fuel is forced into the main combustion chamber, before the force of explosion is completely spent, near the beginning of the power stroke.

To make the point still more clear, the bulk of the fuel, in engines containing this gasifier, can only burn and the engine can only operate efficiently, if the unburned portion of the fuel is forced into the main combustion chamber during the beginning of the power stroke. The object of the primary chamber being two fold, namely, to quickly gasify fuel and quickly discharge it into the main combustion chamber and mixing and burning it with the bulk of fresh air contained within the latter.

In realizing, that the general type of a primary chamber, as shown and described hereinbefore, constitutes a high development of the art, applicant made further improvements which will hereinafter be fully explained. Applicant found, that tubes, particularly perforated tubes, as shown herein, being exposed to violently burning gases at certain periods of the cycle, (both within and without of the tube) require as uniform and efficient semi-cooling as possible, particularly in connection with high speed and large engines, or in engines having special air scavenging systems and also in 4 cycle types of engines wherein the temperatures within the primary chamber are excessive. The heat within such primary chambers may become so great, that almost any steel may melt or be destroyed within a short time and very few expensive materials have been found to stand up for a reasonable length of time. It has been demonstrated in practical service, that the threaded portion of the tube and the nozzle, if the latter is properly designed and if the spray holes are placed sufficiently far apart, rarely or never are destroyed by the heat or by acid, while the portions of the tube which have not been properly semi-cooled, or which have been cooled heretofore very inefficiently, burned out within very short time.

Burning or destruction of the tube or vessel, is caused partly through excessive and unnecessarily prolonged heat and partly through the action of sulphuric acid gases. However, in view of the fact that well cooled parts of the tube and particularly the water-cooled walls inclosing the radially outer portion of the primary chamber, are not attacked, it becomes clear, that with proper cooling, the life of the tubes can be greatly prolonged. One method of cooling the tubes, heretofore has been to make the walls of the tube thick and conduct the heat from the tube to its threaded portion and from there to the casing. Enlarged round end portions of the tube have also been used, forming cooling-contact-surface between a portion of the axially inner end of the tube within the chamber, and between the axially inner end wall of the chamber, within a vertical plane through the axis of the tube. In all cases, the entire heat, except radiating heat, has heretofore been conducted substantially axially through the major axial portion of the tube, within the explosion chamber. The thickness of the tube wall and the proportion of the diameter to the length of the tube are to a certain extent limited and predetermined and for these reasons it is clear, that certain portions of the tube, within the chamber, cannot be well cooled in the manner known heretofore and just explained. Parts of the tubes got red hot and were soon destroyed, and as soon as portions of the tubes are destroyed, the gasifier device operates very inefficiently.

Thin walled perforated tubes produce best results, evidently causing better mixture and stronger explosions within the outer compartment or compartments than thick walled tubes. However, thin tubes are most apt to burn out quickly unless cooled in the manner as proposed by applicant. Tubes having a length of two or three times, more or less, of their respective diameters give good results. Applicant's method of uniformly semi-cooling or heating the tubes greatly assists in scavenging as well as gasifying injected fuel, producing more complete combustion near the beginning of the power stroke, thus increasing the horsepower and life of the engine.

Applicant shows simple and efficient means for cooling gasifier tubes or vessels uniformly, without sacrificing the simplicity of the device as used heretofore. While non-perforated tubes have given fairly good results, if properly installed, perforated tubes are preferred, because they greatly assist in breaking up the limited portion of the fuel which enters into the radially outer compartment, and mixing it with air more uniformly and instantly throughout the radially outer compartment, thus causing a more violent explosion, or quicker combustion within the radially outer compartment and a quicker more positive discharge of fuel into the main combustion chamber.

While it is understood from the aforesaid that semi-cooling can only be permanent and efficient if very good cooling contact exists between the tube and web or wall, applicant desires to make it clear that if webs reach within a very small fraction of an inch to the tube, or vice versa, if the tube and webs become hot and expand, cooling contact may be established and the temperature of the tube may thus be regulated. It is in each case a question of expediency to determine the amount of cooling required and decide how closely a tube may be fitted between webs, how closely the webs should be spaced, how thick they should be, etc. etc.

In its most developed form, the primary chamber, as shown, contains a radially inner compartment which receives fuel directly from a spray valve and which compartment is in communication with the main compression- or combustion-chamber; while the primary chamber also contains another compartment, which latter is in permanent direct communication with the above said fuel receiving compartment, but is substantially isolated from said main combustion chamber, except communicating with the latter mainly by passage through the radially inner compartment.

Broadly speaking applicant's invention consists in a novel combination of a member subdividing a primary chamber in a specified manner, and cooling means for said member, which means are more or less independent from the subdividing member and which means extend through said primary chamber, forming a direct additional path for dissipating or conducting heat substantially away from the member, directly to a liquid-cooled wall inclosing the primary chamber. The perforations shown in the member or tube depend to some extent on my method of cooling, because the latter permits of liberal use of perforations and exposure of the subdividing member to resulting intense flame without overheating or burning it. Similarly, the yieldability of my subdividing member, as shown and explained, and the conductor within the nozzle, cooperate with the other novel features in producing a more reliable and efficient device.

The expressions "partition" or "subdividing member", as used herein, imply in my claims specifically the portion or element, which actually serves as means for subdividing a primary chamber substantially into a plurality of compartments, preferably into a radially inner and radially outer compartment. A partition or subdividing member may be perforated by round holes, or slots, as shown, or in any known manner.

Various modifications may be made in the invention without departing from the spirit thereof and the present exemplification is to be taken as illustrative and not limitative thereof.

Having thus described and explained the method of my invention, I claim:

1. In an internal combustion engine, a main combustion chamber, a primary explosion- or combustion-chamber, a partition member subdividing said primary chamber substantially into two compartments, said compartments being in permanent direct communication with each other, the one of the said compartments being in communication with said main chamber and the other one of said compartments being substantially isolated from said main chamber, except communicating with the latter mainly by passage through said first said compartments, the wall inclosing said primary chamber being liquid-cooled, and provision of cooling means extending substantially the entire length of said partition member.

2. In an internal combustion engine, a main combustion chamber, a primary explosion- or combustion-chamber, a partition- or subdividing-member subdividing said primary chamber substantially into two compartments, said compartments being in permanent direct relatively large communication with each other, the one of the said compartments being in relatively small communication with said main chamber and the other one of the said compartments being substantially isolated from said main chamber, except communicating with the latter mainly by passage through said first said compartment, the wall inclosing said primary chamber being liquid-cooled, one or more cooling webs being provided within said primary chamber, in such manner, that heat may thereby be conducted away from said member through said web or webs substantially directly adjacent said cooled wall.

3. In an internal combustion engine, a main combustion chamber, a primary explosion- or combustion-chamber, a perforated partition- or subdividing-member subdividing said primary chamber substantially into two compartments, said compartments being in permanent direct communication with each other, the one of the said compartments being in communication with said main chamber and the other one of the said compartments being substantially isolated from said main chamber except communicating with the latter mainly by passage through said first said compartment, the wall inclosing said primary chamber being liquid cooled, one or more cooling webs being provided within said primary chamber, in such manner, that heat may thereby be conducted away from said member through said web or webs substantially directly adjacent said cooled wall and provision for injecting fuel mainly into the one of the said compartments which communicates with said main combustion chamber.

4. In an internal combustion engine, a main combustion chamber having a liquid-cooled wall, a primary explosion- or combustion-chamber, a perforated partition- or subdividing-member subdividing said primary chamber substantially into two compartments, said compartments being in permanent direct relatively large communication with each other, the one of the said compartments being in relatively small communication with said main chamber and the other one of said compartments being substantially isolated from said main chamber, except communicating with the latter mainly by passage through said first said compartment, and means for dissipating heat from said dividing member to said cooled wall substantially uniformly as regards the length of said dividing member.

5. In an internal combustion engine, a main combustion chamber, a primary explosion- or combustion-chamber, a partition-member subdividing said primary chamber substantially into a radially inner and radially outer compartment, the one of the said compartments being in communication with said main chamber, relatively small opening or permanent communication between the said compartments near a point where the said one compartment is in communication with said main chamber, relatively large opening or permanent communication between said compartments further distant from the said point, the wall enclosing said primary chamber being liquid-cooled, heat conducting means extending away from said member within said primary chamber substantially directly adjacent said cooled wall, thus providing a substantially direct radially outward path for dissipating heat from points substantially axially along said partition member to said cooled wall, provision for injection of fuel mainly into said radially inner compartment.

6. In an internal combustion engine, a main combustion chamber, a primary explosion- or combustion-chamber, a perforated substantially tubular partition-member subdividing said primary chamber substantially into a radially inner and one or more radially outer compartments, the said radially inner one of the said compartments being in relatively small communication with said main chamber, and the said radially outer one or ones of the said compartments being substantially isolated from said main chamber, but being in relatively large communication with said radially inner compartment, the wall inclosing said primary chamber being liquid cooled, one or more cooling webs being provided within said axially outer compartment or compartments, said web or webs being arranged substantially symmetrically in relation to the longitudinal axis of said member, in such manner, that compressed air or gas may flow substantially freely and unhindered throughout the length of said radially outer compartment or compartments, said web or webs permitting dissipation of heat away from said member, through said radially outer compartment or compartments substantially directly adjacent to said cooled wall.

7. In an internal combustion engine, a main combustion chamber, a primary explosion- or combustion-chamber, a partition-member of substantially tubular shape and being yieldable or resilient in radial direction, said member subdividing said primary chamber substantially into radially inner and radially outer compartments being respectively in permanent direct communication with each other, the radially inner one of the said compartments being in communication with said main chamber, said radially outer one or ones of said compartments being substantially isolated from said main chamber, the wall inclosing said primary chamber being liquid-cooled, one or more cooling webs being provided within said radially outer compartment or compartments, in such manner, that heat may thereby be conducted away from said member through said radially outer compartment or compartments substantially directly adjacent said liquid-cooled wall.

8. In an internal combustion engine, a main combustion chamber, a primary explosion- or combustion-chamber, a partition-member subdividing said primary chamber substantially into two compartments, said compartments being in permanent direct communication with each other, a nozzle 17 being provided directly between one of the said compartments and said main combustion chamber, a plurality of holes 18 being provided within said nozzle substantially within a circle, a raised portion or deflector 20 being arranged within said circle and said nozzle.

9. In an internal combustion engine, a main combustion chamber, a primary explosion or combustion chamber, a partition member of substantially tubular shape and being provided with a slot substantially symmetrically to the axis of said member whereby the latter becomes flexible or resilient in radial direction, said member subdividing said primary chamber substantially into radially inner and radially outer compartments being respectively in permanent direct communication with each other, the said radially inner one of the said compartments being in communication with said main chamber, the said radially outer one or ones of said compartments being substantially isolated from said main chamber, the wall inclosing said primary chamber being liquid-cooled, one or more cooling webs being provided substantially axially within said radially outer compartment or compartments, in such manner, that heat may thereby be conducted away from said member through said radially outer compartment or compartments substantially directly adjacent said liquid-cooled wall.

FRANCIS MARBURG.